Oct. 25, 1932.     A. DINA     1,884,607
MECHANICAL MOVEMENT
Filed July 25, 1929     8 Sheets-Sheet 2

Fig. 2.

INVENTOR
Augusto Dina
BY
Howard W. Dix
ATTORNEY

Fig. 5.

Oct. 25, 1932.  A. DINA  1,884,607
MECHANICAL MOVEMENT
Filed July 25, 1929   8 Sheets-Sheet 6

INVENTOR
Augusto Dina
BY
Howard W. Dix
ATTORNEY

Patented Oct. 25, 1932

1,884,607

UNITED STATES PATENT OFFICE

AUGUSTO DINA, OF JERSEY CITY, NEW JERSEY, ASSIGNOR TO INTERNATIONAL PROJECTOR CORPORATION, OF NEW YORK, N. Y., A CORPORATION OF DELAWARE

MECHANICAL MOVEMENT

Application filed July 25, 1929. Serial No. 380,834.

This invention pertains to an improved power transmission mechanism capable of adjustment while at rest or in motion without varying the cyclic relations between certain elements thereof.

The invention in its broad aspects may be said to comprise a mechanical system wherein a driven member may be changed in its time relation in driving without varying a cyclic relation between itself and certain other driving elements of the mechanism.

In one particular, the invention relates to a simplified system of mechanism, either of the continuously moving type or intermittent type, in which naturally, with motion given to the various elements, there is repeated periodically a cycle of movement between the elements therein. Therefore, at a given instant of time, any two elements will have a relation which is the same as that between them at the corresponding instant of time in any other repetition of the same cycle. It is of course obvious that any element of the system may have, with respect to a point outside of the system, a regular repeating cycle of movement, and in accordance with this invention, the relation of certain elements of the system to elements outside the system may be changed or varied without varying the cyclic relation, at the instant of or during the changing, existing between said certain elements and other elements within the system.

In a more specific instance, the invention relates to a system of mechanism which includes a Geneva movement and permits of adjustment of the driven element of the movement without varying its cyclic relation with the pin which actuates the driven element of the movement.

In another instance, the invention includes a mechanism in which are included two elements which bear a cyclic relation to each other and wherein the relation of one of said elements can be altered with regard to extra-system factors without changing its cyclic relation to the other specified element within the system. For example, if the mechanism includes a Geneva movement having a star wheel and a pin wheel which have a regular cycle of movement with respect to each other, this invention would enable the star wheel position to be changed with regard to the extra-system factors without altering the cyclic relation existing between the pin wheel and the star wheel and vice versa.

It is well understood in any mechanism which includes a Geneva movement, that the load on the driven element of the movement moves intermittently. When it becomes desirable to change the time position of the load on this driven element of the movement, as by rotating the shaft of this element, it has been found that the driving element of the movement moves relatively to the driven element. This relative movement is a disadvantage as it throws the cyclic operation out of time. Thus, heretofore, in changing the driven element of a Geneva movement, the driving element was moved relatively to the driven element and when the mechanism is in its new position it is not in the expected adjusted position due to this relative movement between its members.

Therefore, one of the main and broad objects of this invention is to provide an improved mechanism wherein a moving element may be adjusted without changing the cyclic relation of that element with respect to one or more other elements within the system of which it is a part.

Another object is to provide a simple system of power transmitting elements including an intermittent motion mechanism in which one element of the intermittent mechanism may be altered as to its position without altering its relation cyclically to the other elements within the system.

A further object of this invention is to include in the system two or more members which bear cyclical relation to each other, regardless of whether the elements are continuously or intermittently moving and to provide the simplest means whereby one of said members may have its extra-system relations changed without disturbing its inter-system relations, so that after the change, the inter-system cycle of movements continues from where it left off as if the change had not been made.

Further and more specific objects, features, and advantages will more clearly appear from the detailed description given below when taken in connection with the accompanying drawings which form part of the specification and which illustrate a preferred embodiment of the invention, and in which.

Figure 2:
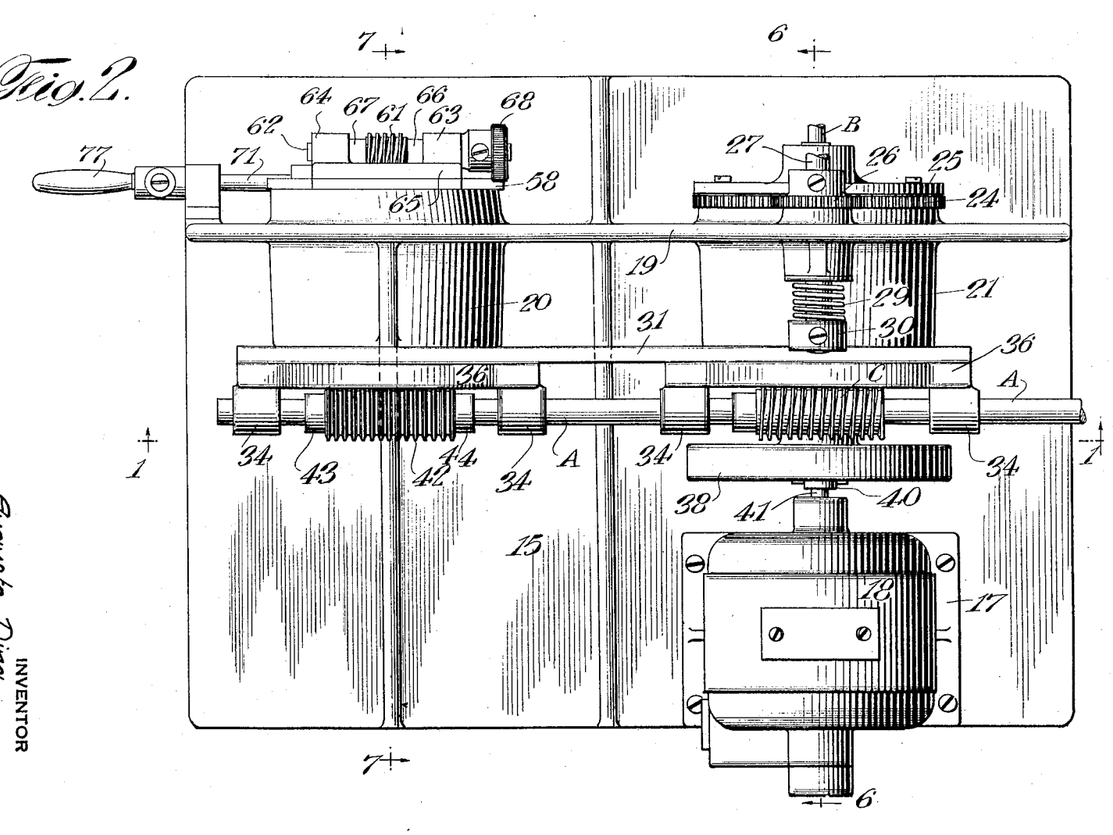
Fig. 2 is a top plan view of the mechanism.

Referring to the drawings in which the preferred present form of the invention has been illustrated, a general contemplation of the invention in its broader aspects will bring to notice the fact that the mechanism illustrated includes a load shaft A and a second load shaft B (see Fig. 2). These shafts may be continuously moving or intermittent in their motion and may involve any combination of these types of movements.

As illustrated, the load shaft A is connected to the load shaft B through the intermediary of a worm C on the shaft A meshing with a gear D on the shaft E. This shaft E is provided with an element such as F which is illustrated as a pin wheel which intermittently causes movement of another element G which is illustrated as a star wheel fastened to the load shaft B.

While an intermittent movement has been shown with gears and worms, pin and star wheels, it is to be clearly understood that this is only because one preferred form of the invention is required to be illustrated. The movement may, if desired, be continuous, and in addition other elements than those illustrated may be employed.

The main point to be borne in mind is that there is a system of mechanism including and extending between shafts A and B which is in motion of one kind or another and that at least certain elements of this system, such as the shafts A and B are assumed to have a periodically recurring cycle of relations which is to remain undisturbed.

The problem solved by the invention was how to change the extra-system relation of either shaft A or shaft B without altering or disturbing the inter-system relations between these two shafts. Another condition that arose was also how to change the extra-system relation of shaft B without altering the inter-system relation which existed between the shaft B and the elements which actuated it, such as the pin wheel F and the star wheel G.

Assume that the system above generally described is in operation with the elements having a regularly recurring cycle of relations and movements. At some instant of time it may be desired to alter the extra-system relation of one of the elements, for instance, the shaft B. This invention permits that change to be made. At the instant the change starts to take place the elements of the system are in a position of definite cyclical relation to each other, and the shaft B can be moved to its new position so that the motion of the system can be continued in an uninterrupted manner or taken up, after stopping, from the very point where it left off. Therefore, if the shafts A and B had a certain relation just before the extra-system variation took place, then this relation will exist after the change has taken place, and the same condition existed as relating to the shaft B, for instance, and the elements F and G.

Considering the system more specifically, the alteration, such as advancing or retarding, of the load shaft B while maintaining the above relations, may be effected by moving part of the system around the axis of the load shaft whose position is to be altered with regard to some factor outside of the system. This movement is effected and regulated by suitable inter-system mechanism so that the relations above referred to are unaltered so that the parts can either keep on moving in an undisturbed manner or, if stopped during the change, can take up their movement from the cyclical point where they left off.

This advantage may be of vital importance in many mechanisms and machines where the cyclical movement has to be constant or has to move in an exact predetermined manner and the simple ready compact means whereby it is here effected is illustrative of only one form which the general system may assume.

Figures 3, 4:
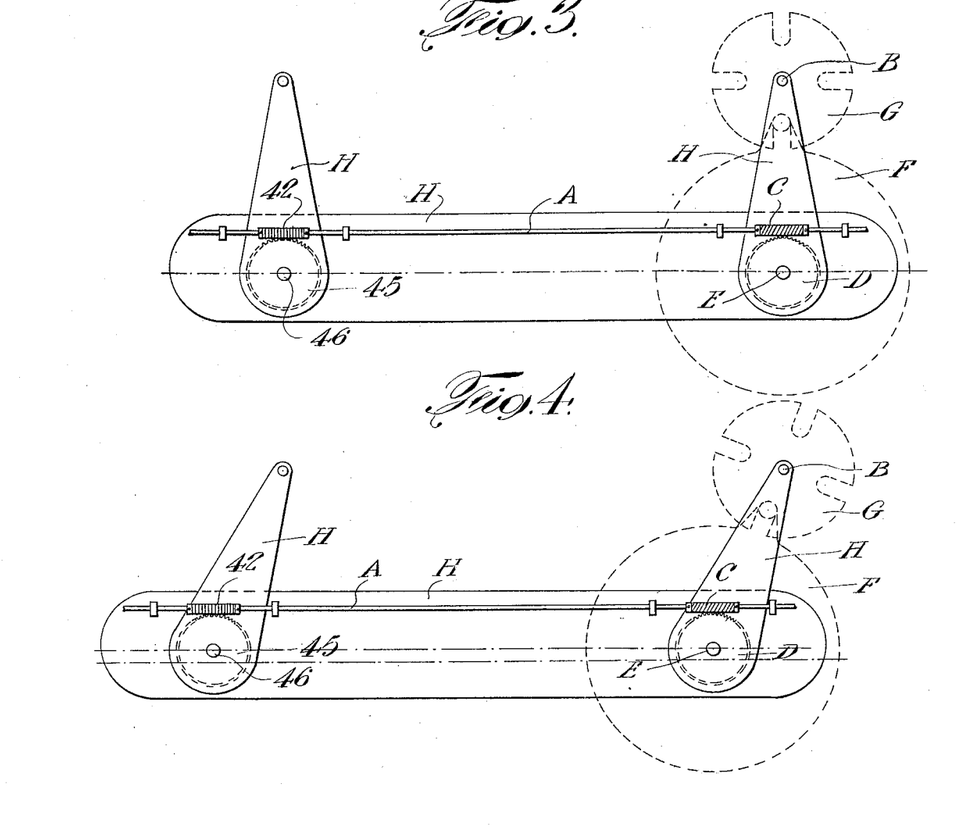
Fig. 3 is a simplified diagram of certain elements of the device shown.
Fig. 4 is a similar view showing the elements in a different position.

To consider the system stripped to its barest essentials, reference may be had to Figs. 3, 4, which are diagrammatic representations of the essential parts in two positions. In these figures, there is shown the shafts A and B with the connecting and related elements such as the star wheel G, pin wheel F, shaft E, worm gear D, and worm C. The positions of the parts shown in Fig. 3 are assumed to be the normal positions. The star wheel and the pin wheel are connected but mounted on a frame element H which is adapted to revolve around the center of the star wheel shaft B while either at rest or in motion and even while the worm C and the gear D are in mesh and either in motion or at rest. The shaft A is slidably mounted on an extension of the frame H in suitable bearings and at the other end of the shaft A there is loosely mounted thereon for rotation a cylindrical rack gear 42 which while it can rotate on the shaft A can not slide along the shaft because it is held closely between collars 43 and 44 thereon. This rack gear is in mesh with a toothed gear 45 fixed on a shaft 46 mounted in a fixed position on a revoluble portion of the slidable frame H which portion is adapted to swing on a center of the same diameter and arc as the gear D.

The problem as stated before is to be able to move the star wheel shaft B, for instance, around its axis to change its extra-system relation with an outside factor, without changing its cyclical relation with respect to shaft A and with respect to the pin wheel F so that when it is in its new adjusted position, the cyclical movement has either been going on uninterruptedly or can continue as if the adjustment had not taken place. To effect this movement, the frames H are rotated around their respective axes as centers for the requisite angle of movement while the gear D, the worm C, the gears 42 and 45 are in engagement, and without causing any substantial longitudinal movement of the shaft A and without any appreciable angular movement thereof. If this condition can be fulfilled, then no matter how much the frame is adjusted, the cyclical relations above mentioned can be maintained. To maintain this condition is of advantage because in ordinary circumstances when the pin wheel is revolved around the star wheel axis as a center, and not being fixed to its support, it consequently would alter its angular position with respect to the star wheel and the gear D would also alter its relation to the worm C with which it is in mesh all the time during the angular swing.

The desirable relations are maintained by reason of the following circumstance:

The angular alteration between the gear D and the worm C is prevented by producing as pure a rolling action between the gear D and the worm C as possible. This pure rolling is effected by designing the gear 45 to swing around an equivalent center of the same radius or even different radius but designing its diameter with respect to the rack gear 42 so that as the gear 45, fixed on the frame H, is revolved around its center the same angular distance, it will have an arc of contact with the rack gear 42 of the same linear distance as that which would exist between the worm and the worm gear D during the same angle of swing if pure rolling were taking place. This will force a pure rolling action between the worm C and the gear D and the shaft A's resultant movement will be appreciably nil except vertically and there will be no appreciable angular movement of the shaft A, and consequently none with respect to the shaft B since as the pin wheel turns around the shaft B its relation with the star wheel and the shaft B is not altered. Due to the fact that the worm 42 is loose for rotation on the shaft A and the engagement between the worm 42 and the gear 45 is one of straight rack and pinion movement, there will be no tendency to angularly move the shaft A but this shaft will be constrained against longitudinal movement, altho the frame on which it is slidable will move laterally and in an arc. It is obvious that an adjustment of greater degree and in the opposite direction may be effected as well as that shown. In effect this form of the system is such as to so design the rack gear 42 and the gear 45 as to create in the worm C and the gear D the proper rolling relation.

Figure 11:
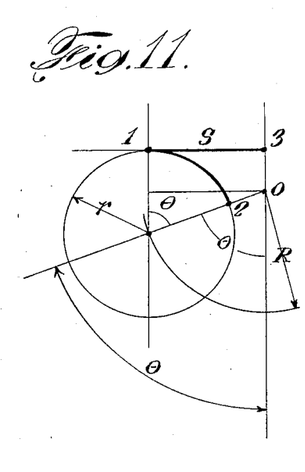
Fig. 11 is a mathematical diagram of certain movements.

Referring to Fig. 11, the mathematical diagram shown illustrates the physical relations which must be maintained as to the gear and worm diameters and movements to establish pure rolling therebetween. In this Fig. 11 the gear of radius $r$ is to be swung through an angle $\theta$ around the center O while still in mesh with the worm and pure rolling between them must ensue. In thus swinging the gear will travel along the worm a linear distance of 1–3 which is named $s$. The diameter of swing is R and the first equation which is true for these trigonometrical relations is $$s \text{ equals } R \sin \theta.$$

For pure rolling the arc of contact of the gear must equal the distance $s$ and, since the arc is equal to $r\theta$, then $R \sin \theta$ must be made equal to $r\theta$. Solving this relation there is obtained in terms of $r$ the equation $$r \text{ equals } \frac{R \sin \theta}{\theta}$$

which gives the relation of the gear diameter of the system in terms of the diameter of swing and the angle of swing for pure rolling to take place.

It is obvious that while this adjustment is taking place, the shaft E can be driven to continue the cycle of movements as will be clear from the following description of the detail and preferred mechanism shown in the remaining figures of the drawings.

In the present preferred form of the invention shown in the drawings, there is provided a base plate 15, which near one corner has a dais 16 to which is bolted the base 17 of an electric motor 18. Longitudinally along the base 15 adjacent one edge is disposed a vertical integral wall 19 in which at spaced intervals are large cylindrical bearing casings such as 20 and 21 which have the same diameter and whose centers are the same height above the base 15.

Within the bearing casing 21 is rotatably mounted the rotor 22 in the form of an externally smooth-surfaced casting having certain chambers formed therein. On one face of the rotor 22 there is a flange 23 formed with peripheral teeth such as 24 and a cover plate 25. The teeth 24 are engaged by a pinion 26 keyed to shaft 27 having a finger knob 28 and journalled in the upper part of wall 19. A spring 29 is disposed between wall 19 and a shoulder on a collar 30 around which it is coiled and which is fastened to one end of shaft 27. This spring keeps shaft 27 in place and pinion 26 in mesh with teeth 24 on flange 23. By turning knob 28, the rotor 22 may be turned within the bearing 21. This rotor 22 is part of the frame H above mentioned.

In the cover plate 25 there is centrally disposed a bushing 30' supporting a shaft B on the inner end of which within one of the chambers in rotor 22 is a star wheel G of an intermittent movement. Another member of this movement is a pin wheel F engaging with the star wheel G and mounted on a shaft E. This shaft E is journalled in the main body of rotor 22 and in a sleevelike extension 35 thereof but extends therebeyond. On the end of shaft E is fixed a worm gear D integral with a sleeve 37. A fly-wheel 38 is mounted on sleeve 37 and fastened to gear D. The fly-wheel 38 is provided with an internal ring gear 39 with which meshes a drive pinion 40 on the shaft 41 of the electric motor 18.

Figure 1:
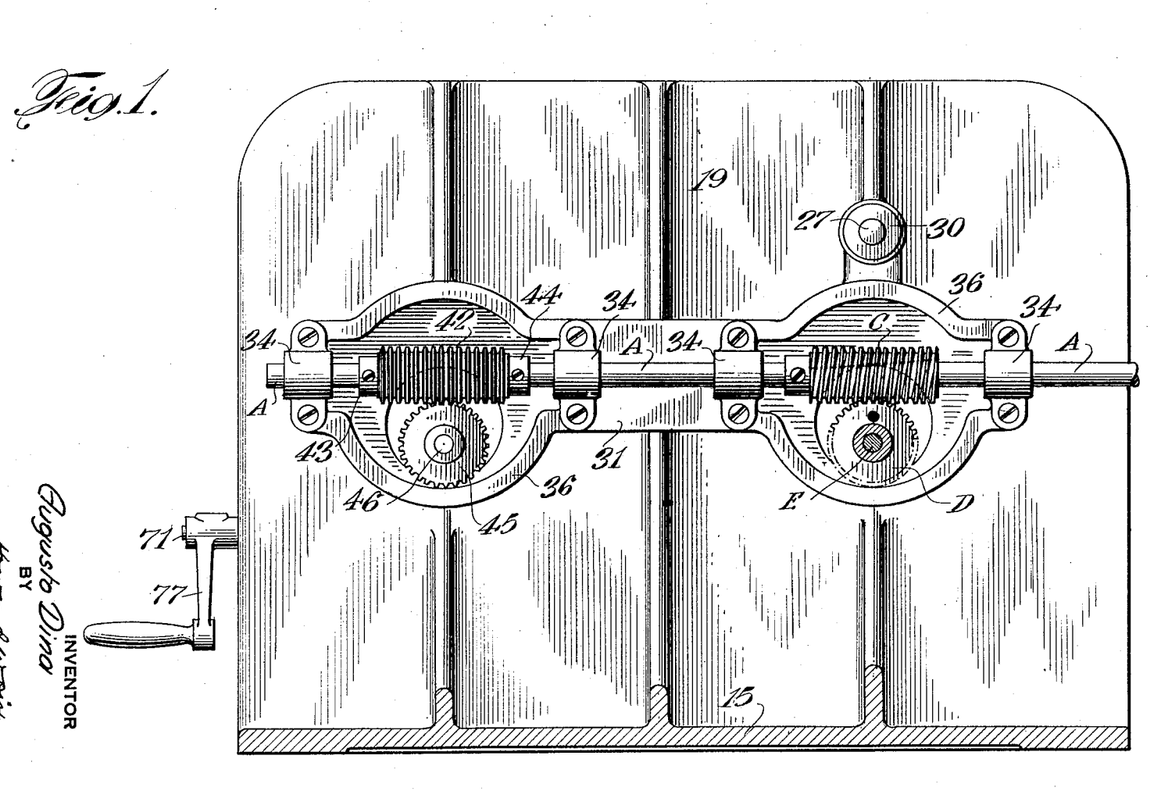
Fig. 1 is an elevational view of part of the improved mechanism. The view is a partial section taken on the line 1—1 of Fig. 2.
Figure 5:
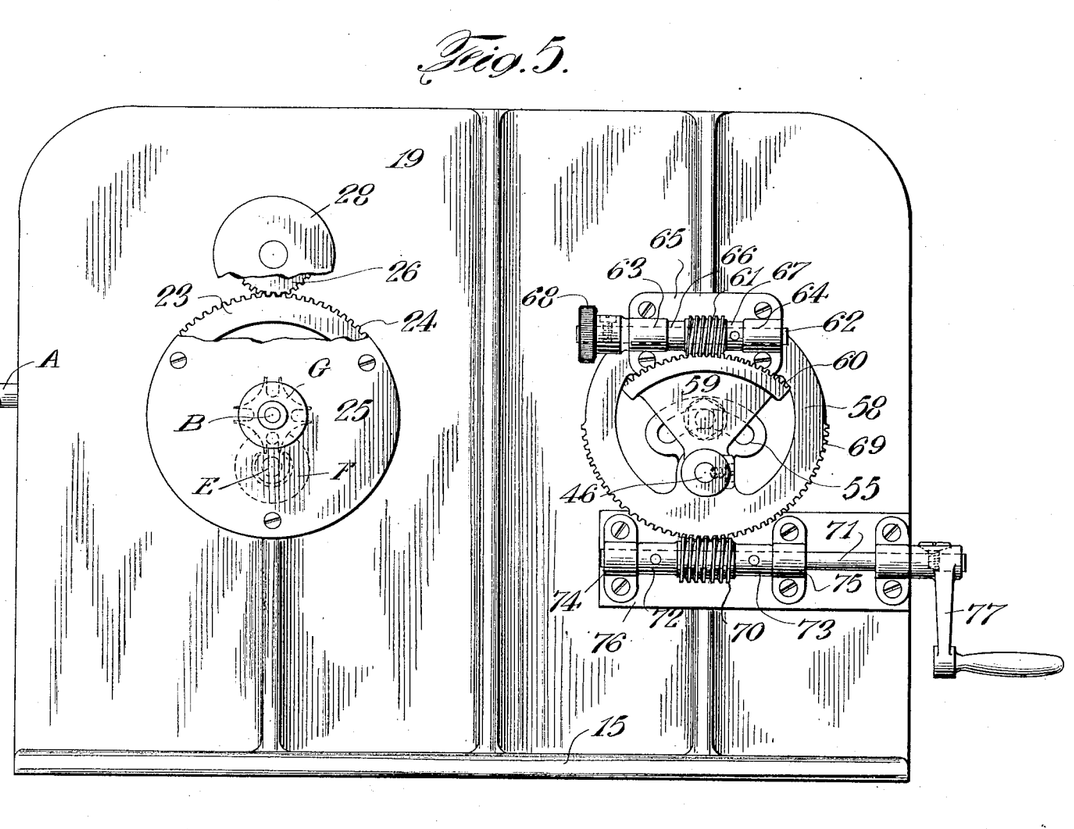
Fig. 5 is a rear elevation of the device.

Referring to Figs. 1, 2, and 5 particularly, it will be seen that the worm C is pinned to shaft A which is mounted slidably in bearings such as 34 on plates 36 fastened to a connecting link 31. These plates 36 and the link 31 form part of the frame H above mentioned and may be made in one piece if desired.

Figure 6:
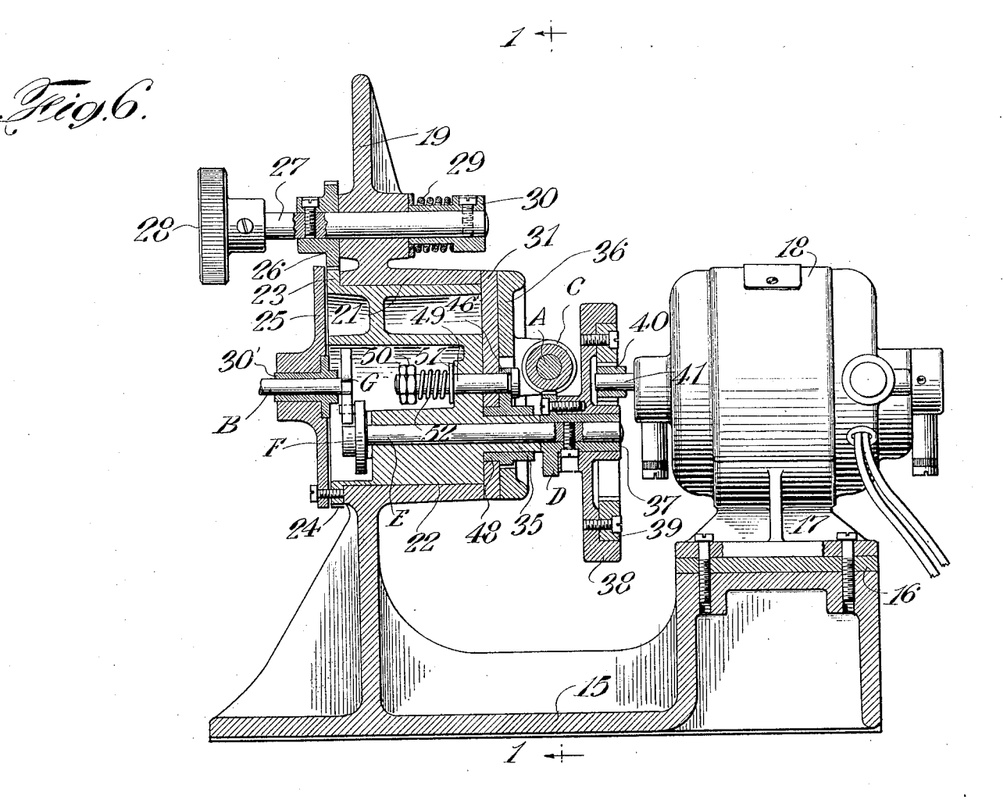
Fig. 6 is a transverse vertical section taken on the line 6—6 of Fig. 2.
Figure 8:
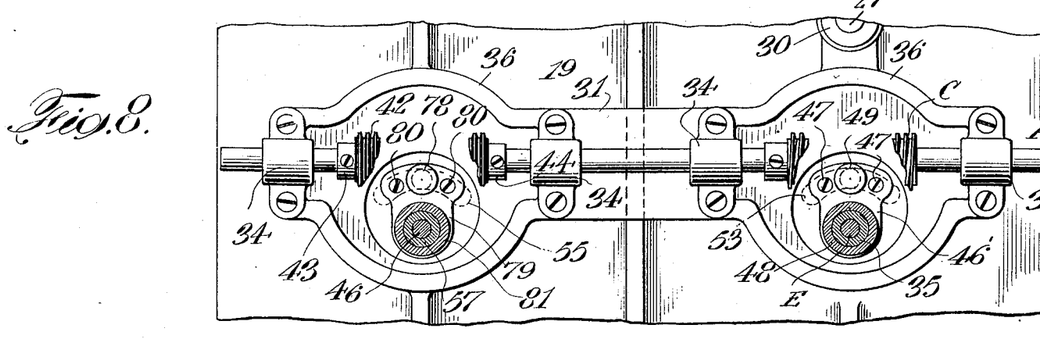
Fig. 8 is a simplified elevation of the device with certain parts broken away and others omitted.
Figure 9:
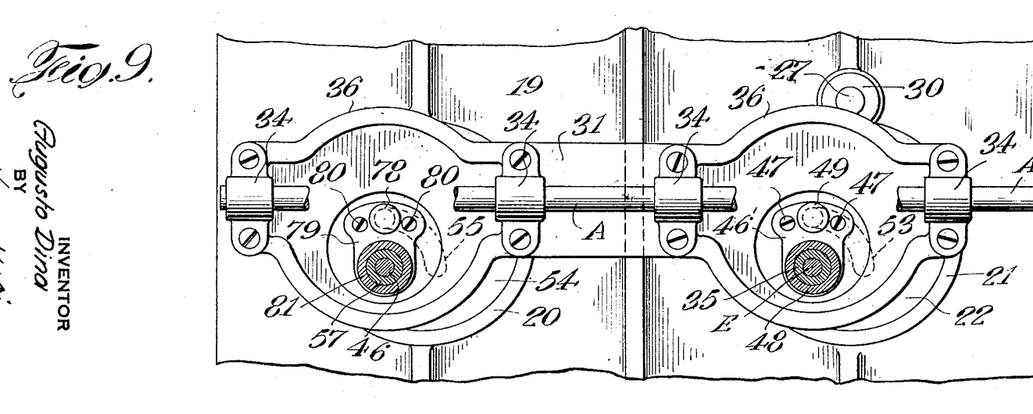
Fig. 9 is a similar view showing the parts in a different position.

As seen in Fig. 6, to the face of the link 31, there is fastened a plate 46' by means of screws 47 (see Figs. 8 and 9). This plate has an integral sleeve 48 surrounding the extensions 35 of rotor 22 and at its upper end has an aperture into which is headed the end of a stub shaft 49, the outer end of which has lock nuts 50. Between nuts 50 and a washer 51 bearing against an inner face of a chamber in rotor 22 is a spring 52 which presses against nuts 50 to urge the stub shaft 49 inwardly and hold link 31 closely against the face of the casing 21 and the rotor 22. As clearly seen in Figs. 8 and 9, the rotor 22 where stub shaft 49 passes through it is provided with an arcuate slot 53 with the axis of shaft E as a center. The position of slot and stub shaft shown in Fig. 8 is the normal position and in Fig. 9 an adjusted position. In reference to Fig. 6, it will be noted that the rotor 22 is turned around its center which is in line with the axis of shaft B and the drive shaft 41 of motor 18 and also stub shaft 49 when in its normal position.

Figure 7:
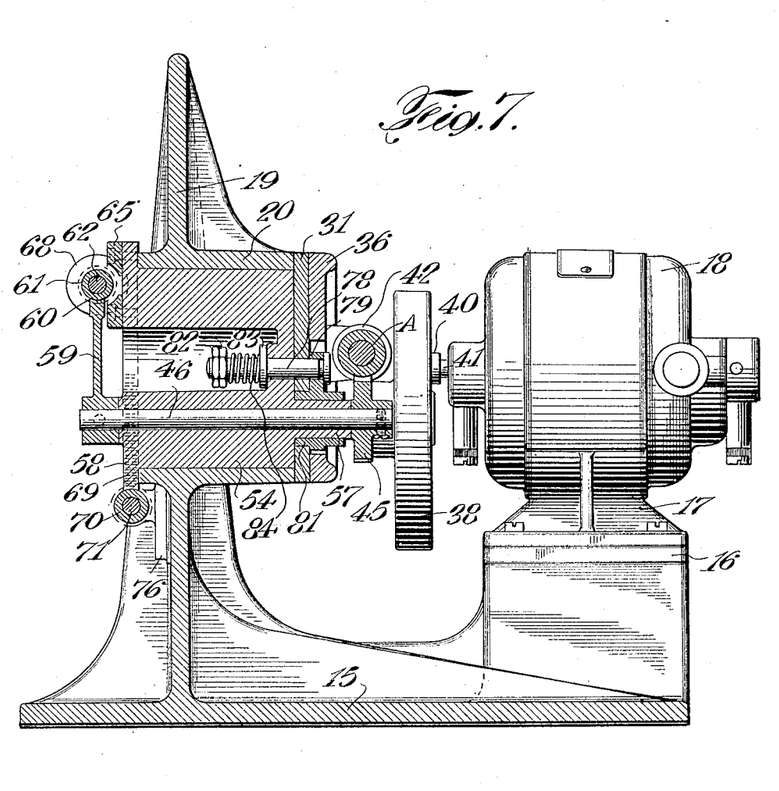
Fig. 7 is a similar section taken on the line 7—7 of Fig. 2.

Referring to Fig. 7, this is a vertical transverse section taken through bearing casing 20 of Fig. 2. This casing receives a rotor 54 similar in diameter to rotor 22 and having chambered portions. Rotor 54 has a curved slot 55 similar in arcuate diameter to slot 53 in rotor 22 and with the axis of shaft 46 as a center. Shaft 46 extends through rotor 54 and its extension 57. On one end of shaft 56 is fixed a spur gear 45 meshing with rack gear 42 on shaft A. This rack gear 42 is loose on shaft A but is held from sliding along it by means of collars 43 and 44 fastened thereon. On the other end shaft 56 bears in an aperture in cover plate 58 and carries (see Fig. 5) a fixed rack sector 59 having peripheral teeth 60 meshing with a worm 61 on shaft 62 rotatable in bearings 63 and 64 on plate 65 fastened to the back of cover plate 58. Shaft 62 is held from longitudinal movement by collars 66 and 67 between bearings 63 and 64 and is turned by finger knob 68.

Cover plate 58 has peripheral teeth 69 engaged by a worm 70 on shaft 71 between collars 72 and 73 disposed between bearings 74 and 75 on a plate 76 fastened to the partition 19. Shaft 71 is turned by a handle 77.

Link 31 and plate 36 extend across the front of rotor casing 54 and casing 20 and link 31 is held thereagainst by means of stub shaft 78 headed into plate 79 which is fastened to the front of link 31 by screws 80 (see Figs. 8 and 9). This plate 79 has a sleeve 81 surrounding rotor extension 57. Stub shaft 78 in normal position (see Fig. 8) is in line with the axis of rotor 54 and extends through slot 55 and carries nuts 82 between which and washer 83 against the inner face of rotor 54 a spring 84 is disposed around stub shaft 78 and urges link 31 against the face of rotor 54 and casing 20 in a manner similar to that previously described with reference to Fig. 6.

Figure 10:
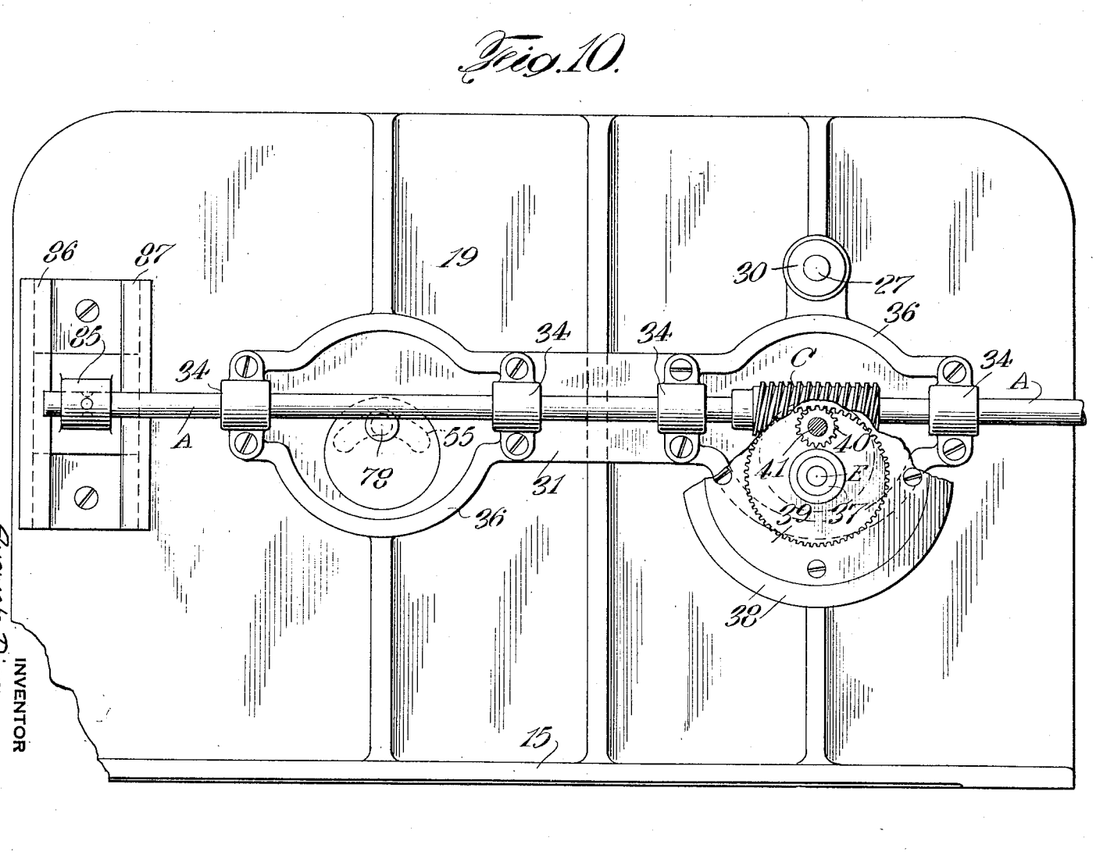
Fig. 10 is another similar view showing a modified form of the invention.

In Fig. 10, the left hand end of the shaft A is borne in a block 85 which can slide vertically on the partition 19 in guides 86 and 87. This block is fixed to the shaft A and is held from longitudinal movement with respect to the partition 19 by the guides 86 and 87. In this modification, the shaft is actuated as before except that worm rack 42 and spur gear 45 are not needed since the longitudinal movement is constrained in the manner disclosed. Otherwise the movement is as before.

*Operation*

Assuming the parts in the position shown in Figs. 1 and 3, which is their normal position, and that it becomes necessary and desirable to change the extra-system position of the load shaft B without disturbing its cyclical relation to the pin wheel shaft E or the other load shaft A all of which have a definitely recurring cycle of movement. If the gear D can be made to roll around the worm C then its cyclical relation to the star wheel shaft B will not be disturbed and if the rolling is practically pure then the shaft A will not be rotated and consequently its cyclical relation to the star wheel shaft B will not be altered. It must be noted that the shaft E is not fixed in the rotor 22 and that ordinarily swinging the rotor 22 around the center of shaft B will cause an angular change of position of the pin wheel and the star wheel shafts. However, if the shaft A can be constrained to stay in a substantially fixed longitudinal position while the gear D is rolling over it, it will form a fixed surface, and pure rolling will result. This fixation of the shaft A is effected by providing the rotor 54 swingable on about the same diameter as the rotor 22 and with a spur gear 45 fixed thereto. This gear 45, as the rotor 54 is swung, rolls over the surface of a cylindrical rack gear 42 which is rotatably loose on the shaft A but prevented from having any longitudinal movement thereon. Since the gear 45 is fixed on the rotor 54 it rolls over the rack 42 and fixes the position of the shaft A so that no appreciable longitudinal movement thereof takes place altho it does move upward and downward as the swing occurs to one side or the other of the normal position. Thus the star wheel or load shaft B can be adjusted without changing its inter-system relation to the pin wheel and the load shaft A. In the modification shown in Fig. 10, the rack gear 42 and spur gear 45 are eliminated and the shaft A is held from longitudinal movement by the block 85 which is fastened thereto and which is permitted to move only vertically in the guides 86 and 87. This is another way in which the shaft A is constrained to keep a fixed longitudinal position altho it is allowed a necessary vertical movement.

The rotors 22 and 54 are connected by link 31 and its associated elements and can be simultaneously actuated either by moving the finger knob 28 or the handle 77 as is apparent. The spur gear 45 can be occasionally rotated on its shaft 46 to change the angular position of shaft A by means of the finger knob 68. This will cause a longitudinal movement of the shaft A which will cause worm C to move over gear D and turn slightly and at the same time the pin shaft E will turn correspondingly to change the load shaft B so that altho the shaft A angle has been changed, its cyclical relation to the shaft B is maintained.

This swinging movement of the rotors 22 and 54 can take place without interrupting the drive mechanism because it will be noted that the center of the motor drive shaft 41 is in line with the center of the swing of the rotor 22.

Thus there is provided a swinging train of gears one of which meshes with a worm on a shaft and is in constant mesh even while swinging. The shaft is moved around the same center as the train of mechanism and is constrained to remain substantially stationary as far as longitudinal movement is concerned.

In summation, the invention is seen to provide a simple compact arrangement of mechanism whereby two or more elements such as shafts can be kept in their inter-system cyclical relation at all times while permitting the extra-system relation of one of them to be altered. Furthermore altho one element is altered as to its extra-system relations the cyclical relations existing between it and the driving elements within the system can be maintained whether the system is at rest or in motion.

While the invention has been described in detail and with respect to a preferred form thereof, it is not intended to limit it to such details and forms since many changes and modifications may be made and the invention embodied in other forms without departing from the spirit and scope of the invention in its broader aspects. Hence it is intended to cover any and all forms of the invention coming within the language or scope of any one or more of the appended claims.

What is claimed is:

1. A power transmission system comprising a load shaft, a mechanism for driving said load shaft, and including a worm gear, a worm in mesh with said gear, a shaft on which said worm is mounted, means for moving said gear around the load shaft as a center, and means for causing pure rolling between said gear and said worm during said movement to prevent longitudinal and angular movement of said worm shaft.

2. A power transmission system comprising a load shaft, a star wheel thereon, a pin wheel engaging with the star wheel, a worm gear on the shaft with the pin wheel, a worm meshing with said worm gear, a shaft on which said worm is fastened, means for moving the pin wheel and said worm gear around the load shaft as a center while maintaining the mesh between said worm gear and the worm and preventing longitudinal and angular movement of the worm shaft.

3. A power transmission system comprising a load shaft, a star wheel thereon, a pin wheel engaging with the star wheel, a worm gear on the shaft with the pin wheel, a worm meshing with said worm gear, a shaft on which said worm is fastened, a slidable frame supporting said worm shaft, means for moving said worm gear and the pin wheel in an arc with the load shaft as a center, means for moving the worm shaft-supporting frame in the same arc, and means on the frame to constrain the longitudinal movement of the worm shaft to produce substantially pure rolling between the worm and the worm gear.

4. A power transmission system comprising a load shaft, a rotor in which it is centrally mounted, a train of mechanism rotatably mounted in the rotor to drive the load shaft, said mechanism including a worm gear, a worm meshing with said worm gear, a shaft on which said worm is fixed, means for moving said rotor around the load shaft as a center, and means for maintaining the worm gear and the worm in mesh during said movement without longitudinal displacement or turning of the worm shaft.

5. A power transmission system comprising a load shaft, a rotor in which it is centrally mounted, a train of mechanism rotatably mounted in the rotor to drive the load shaft, said mechanism including a worm gear, a worm meshing with said worm gear, a shaft on which said worm is fixed, a slidable frame supporting said worm shaft, another rotor connected to the frame at a spaced point, and swingable in an arc of substantially the same radius as the first rotor, and means on the second rotor and engaging with the worm shaft to constrain its longitudinal tendency in order to produce pure rolling between the worm gear and the worm.

6. A power transmission system comprising a load shaft, a rotor in which it is centrally mounted, a train of mechanism rotatably mounted in the rotor to drive the load shaft, said mechanism including a worm gear, a worm meshing with said worm gear, a shaft on which said worm is fixed, a slidable frame on which the worm shaft is supported, another rotor connected to the frame at a spaced point, and swingable in an arc of substantially the same radius as the first rotor, a gear fixed to said second rotor, a rack gear loosely rotatable but longitudinally fixed on said worm shaft and meshing with said gear on the second rotor, said frame connected to each of the rotors, the arc of movement of the gear over the rack gear being designed to be the same as the arc of travel of the worm gear over the worm under pure rolling conditions.

7. A power transmission system comprising a load shaft, a rotor, a gear thereon adapted to swing in a predetermined arc around the center of the rotor, a worm meshing with the gear, a shaft on which the worm is fixed, and means for producing pure rolling between the gear and the worm and preventing longitudinal and angular movement of the worm shaft during the movement.

8. A power transmission system comprising a load shaft, a rotor, a gear thereon adapted to be swung in a predetermined arc around the center of the rotor, a worm meshing with the gear, a shaft on which the worm is fixed, a rack gear on the worm shaft at a spaced point free for rotation thereon but prevented from longitudinal movement thereon, a second gear meshing with said rack gear, and means for giving said second gear a swing in an equivalent arc or an arc such as to produce between it and its rack gear a rolling contact distance equal to that desired to be produced between the worm gear and the worm whereby pure rolling results between the worm and the worm gear.

9. A power transmission system comprising a load shaft, a rotor, a gear thereon adapted to be swung in a predetermined arc around the center of the rotor, a worm meshing with the gear, a shaft on which the worm is fixed, a rack gear on the worm shaft at a spaced point free for rotation thereon but prevented from longitudinal movement thereon, a slidable frame supporting said worm shaft and connected to said rotor, a second rotor connected at a spaced point to said frame, a fixed gear on said second rotor, and meshing with said rack gear, means for swinging said rotors in predetermined arcs, the rolling arc of contact between the rack gear and its associated fixed gear being predetermined and designed to be the same as the arc of rolling contact between the worm and the worm gear under conditions of pure rolling, said worm shaft thus constrained in longitudinal movement and prevented from angular movement to maintain its cyclical relation with the load shaft.

AUGUSTO DINA.